United States Patent [19]
Utumi et al.

[11] 3,896,198
[45] July 22, 1975

[54] PROCESS FOR PRODUCING A FOAMED POLYOLEFIN INSULATED CONDUCTOR

[75] Inventors: Atushi Utumi; Yasuaki Fujiwara; Akira Asai, all of Hyogo; Masao Jitsukawa, Saitama, all of Japan

[73] Assignee: Dainichi Nippon Cable Co., Ltd., Amagasaki, Japan

[22] Filed: Jan. 31, 1973

[21] Appl. No.: 328,162

[30] Foreign Application Priority Data
Jan. 31, 1972  Japan.............................. 47-11731

[52] U.S. Cl. .................. 264/45.9; 264/40; 264/54; 264/174; 264/211; 264/DIG. 5
[51] Int. Cl. ........................ B29d 27/00; B29f 3/10
[58] Field of Search ............ 264/54, 51, DIG. 5, 49, 264/124, 40, 211

[56] References Cited
UNITED STATES PATENTS

| | | | |
|---|---|---|---|
| 3,068,532 | 12/1962 | Higgins | 264/54 X |
| 3,387,073 | 6/1968 | Larsen | 264/211 |
| 3,536,796 | 10/1970 | Rock | 264/49 |
| 3,574,160 | 4/1971 | Hsu | 264/211 X |
| 3,624,182 | 11/1971 | Kubota | 264/211 X |
| 3,665,068 | 5/1972 | Duling | 264/211 |

FOREIGN PATENTS OR APPLICATIONS

| | | | |
|---|---|---|---|
| 45-32449 | 10/1970 | Japan | 264/DIG. 5 |
| 45-32450 | 10/1970 | Japan | 264/DIG. 5 |
| 1,044,502 | 10/1966 | United Kingdom | 264/49 |

OTHER PUBLICATIONS
Brydson, J.A. "*Plastics Materials*," Princeton, N. J., D. Van Nostrand, c1966, pp. 64–74.
Brandrup, J. and E. H. Immergut, Edts. "*Polymer Handbook*" New York, Interscience, c1966, page IV-187.
*Encyclopedia of Polymer Science and Technology*. Vol. 6, sections "Ethylene Polymers: High–Molecular– Weight Ethylene Polymers." New York, Interscience, c1967, pp. 332–338.
*Encyclopedia of Polymer Science and Technology*. Vol. 10, Sections "Plasticizers: Polyolefins." New York, Interscience, c1969, pp. 284–285.

*Primary Examiner*—Philip E. Anderson
*Attorney, Agent, or Firm*—Sughrue, Rothwell, Mion, Zinn & Macpeak

[57] ABSTRACT

A process for producing a foamed polyolefin insulated conductor having a insulation wall thickness of 0.08–0.5 mm by extruding a polyolefin melt expandable with the aid of a chemical blowing agent contained therein onto a conductor having a outer diameter of 0.32–1.20 mm, comprising (a) adding a softening agent having a viscosity lower than $10^4$c.st. at 20°C and a boiling point of 150°–400°C to a polyolefin melt in an extruder in an amount satisfying the following formulae;

$$5 \leq X, \text{ and } -10 \log_{10}(MI) \leq X \leq -10 \log_{10}(MI) + 30$$

where, $X$ is the amount of softening agent in percent by weight based on the polyolefin melt, and $MI$ is a melt index of the polyolefin, (b) mixing said polyolefin melt and said softening agent in the extruder, (c) extruding the polyolefin melt mixed with the softening agent onto the conductor to form a foamed layer around the conductor, the conductor, prior to being introduced into the crosshead of the extruder having been heated up to a temperature Tc (°C) satisfying the following formula;

$$-0.4 \, Tr + 160 \leq Tc \leq -0.4 \, Tr + 300$$

where, $Tr$ is a temperature of the polyolefin melt in the crosshead of the extruder, and (d) initiating water cooling of the foamed polyolefin layer on the conductor within a period of $2 \times 10^{-2}$ second after the layer leaves the crosshead.

13 Claims, 1 Drawing Figure

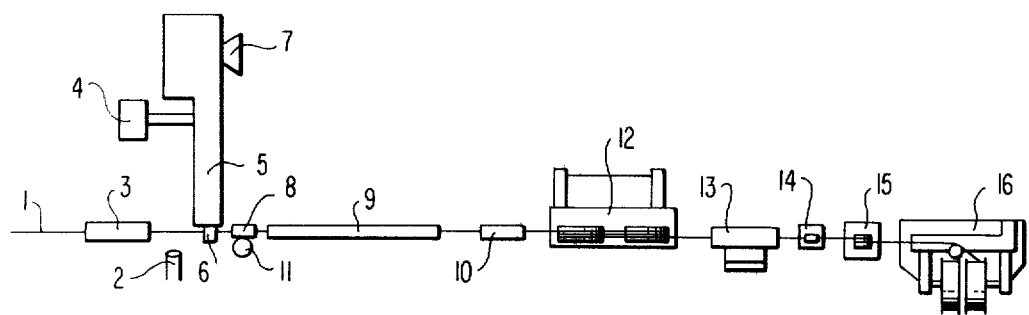

PROCESS FOR PRODUCING A FOAMED POLYOLEFIN INSULATED CONDUCTOR

BACKGROUND OF THE INVENTION

1. Field of the Invention

This invention relates to a novel process for producing a thin foamed polyolefin insulated conductor at a high line speed, and the conductor is preferably used as an insulated conductor for a communication cable. In specific embodiments, the invention is directed to a process for producing a foamed polyolefin insulated conductor wherein a polyolefin blended with a chemical blowing agent is extruded on a conductor and the polyolefin is expanded by the action of the blowing agent.

2. Description of the Prior Art

Foamed polyolefins, especially foamed polyethylene, have been widely used as insulating materials for the conductors of communication cables. One of the problems encountered during the production of such insulated conductors is the relatively low extrusion speed of the insulating material on the conductor, that is, it would be desirable to coat the insulating material on the conductor at a higher line speed. Polyolefins have, in general, a high melt viscosity, and therefore, in order to extrude the polyolefins at a high line speed, it is necessary to elevate the temperature of the polyolefins, e.g., to a temperature higher than 250°C. However, chemical blowing agents which are able to advantageously expand the polyolefins at such a high temperature are unavailable, and thus it has been necessary to perform the extrusion at a temperature lower than 230°C and extrusion at high line speeds, for example, at 500 m/min or more, is difficult to achieve.

A process for producing foamed polyolefin insulated conductors using chemical blowing agents at a high line speed has been proposed in Japanese Patent Publication Nos. 32449/70, 32450/70, etc. In this known process, expandable polyolefin compounds which are blended with a chemical blowing agent are swollen, before extrusion, with organic liquids such as Tetralin (tetrahydronaphthalene), xylene, etc. The organic liquids which are thus included in the swollen polyolefin compounds lower the viscosity of the polyolefin melt in the extruder and as a result, the polyolefins may be extruded at a high line speed at the expansion temperature of the chemical blowing agent, for example, at a temperature lower than 200°C. However, this known process has some faults: (i) the swelling of polyolefin compound with an organic liquid requires a long period of time; (ii) it is difficult to reproducibly control the swelling degree, and a change in the swelling degree results in a change in the electrical and mechanical properties of the product; (iii) a series of large-scale equipment required for swelling the polyolefin compound and keeping the swollen compound at a constant condition.

The above faults are important when it is realized that in foamed, insulated conductors for communication cables the insulation layer thereof must be uniformly foamed, the surface of the layer must be smooth and the mechanical strength thereof, particularly the elongation characteristic, must be high.

SUMMARY OF THE INVENTION

In view of the above facts, the inventors developed a method for lowering the viscosity of a polyolefin melt by directly injecting an organic liquid into the polyolefin melt in the extruder and by mixing the organic liquid and the polyolefin melt by the action of the mixing effect of the extruder, and have achieved the high speed extrusion of polyolefins at low temperatures. According to this process, high speed extrusion of polyolefins is possible by means of very simple apparatus and operation.

It is a primary object of the present invention to provide an improved process for producing foamed polyolefin insulated conductors at high line speed.

Another object of the present invention is to provide foamed polyolefin insulated conductors of a uniformly foamed polyolefin and of excellent mechanical properties.

In a greater detail, the inventors have found that the above mentioned objects can be achieved according to the process of the present invention where a foamed polyolefin insulation layer having a thickness of 0.08–0.5 mm is formed around a conductor having a size of 0.32–1.2 mm $\phi$ (which is formed of a conductor material as is conventionally used at present in a communication cable, such as copper conductor, aluminum conductor etc).

Accordingly, the present invention provides a process for producing a foamed polyolefin insulated conductor having a insulation wall thickness of 0.08–0.5 mm by extruding a polyolefin melt having a chemical blowing agent therein onto a conductor having an outer diameter of 0.32–1.20 mm, comprising (a) adding a softening agent having a viscosity lower than $10^4$ c.st. at 20°C and a boiling point of 150°–400°C to a polyolefin melt in an extruder in an amount satisfying the following formulae;

$$5 \leq X, \text{ and } -10 \log_{10}(MI) \leq X \leq -10 \log_{10}(MI) + 30$$

where, $X$ is an amount of the softening agent expressed as a percentage by weight in the polyolefin melt, and $MI$ is a melt index of the polyolefin; (b) mixing said polyolefin melt and said softening agent in the extruder; (c) extruding the polyolefin melt mixed with the softening agent onto the conductor to thereby form a foamed layer around the conductor, the conductor, prior to being introduced into a crosshead of the extruder, having been heated to a conductor temperature $Tc$ (°C) satisfying the following formula;

$$-0.4\, Tr + 160 \leq Tc \leq -0.4\, Tr + 300$$

where, $Tr$ is the temperature of the polyolefin melt in the crosshead of the extruder (hereinafter referred to as the "extrusion temperature"); and then (d) initiating water cooling of the foamed polyolefin layer on the conductor within $2 \times 10^{-2}$ second after the layer leaves the crosshead of the extruder.

BRIEF DESCRIPTION OF THE DRAWING

The FIGURE is a schematic illustration of the processing sequence of the present invention.

DETAILED DESCRIPTION OF THE INVENTION

The present invention will initially be explained in out line with reference to the attached drawing.

A conductor (1) is passed through a conductor preheating device (3) of the induction type, and heated to a specified temperature and is then introduced into an extruder crosshead (6). The temperature of the preheated conductor is measured by a spot focus type infrared thermometer (2). On the other hand, expandable polyolefin pellets containing a chemical blowing agent are put in a hopper (7) of an extruder (5) and are melted in the extruder (5). A predetermined amount of softening agent (described in detail at a later point of this specification) is injected into the polyolefin melt in the extruder by means of an injection pump (4) through a nozzle (not shown) piercing through the barrel wall of the extruder. Thereafter the polyolefin melt and the injected softening agent are mixed together by the action of the mixing effect of the extruder to lower the viscosity of the polyolefin melt. Polyolefins used in this invention in general have a melt viscosity of $10^4$–$10^6$ c.p. at 190°C, at a shear rate of $10^2$/sec. By the above admixing with a softening agent the melt viscosity of the resultant mixture of polyolefin and the softening agent falls in the range of $10^2$–$10^5$ c.p. at 190°C and at a shear rate of $10^2$/sec. The expandable polyolefin compound thus mixed with the softening agent is extruded from a die of the crosshead (6) on the conductor (1).

The coating layer which has been extruded from the orifice of the die and released from the high pressure under which the polyolefin melt is maintained (the pressures used are in accordance with those commonly used in the prior art, e.g., on the order of 50–500 Kg/cm$^2$) in the interior of the extruder expands and then is carried to a movable cooling water trough (8) and succeedingly to a cooling water trough (9), while the insulation layer is quenched and solidified. In the present invention, it is essential that the quenching is commenced within a period of time after the layer emerging from the die as described later in detail. On the other hand, the overall time of cooling of the layer conductor is not overly critical and may be selected somewhat arbitrarily so long as the pore size of the foamed layer is not adversely affected. Usually in commercial operation the overall time of cooling is in the range of from about 0.5 to about 5 seconds though greater and lesser values may be used. The movable cooling water trough (8) is automatically moved forward and backward along the running direction of the conductor by means of a servo-motor (11) which is mounted on the water trough so as to keep the coaxial capacitance of the foamed polyolefin insulated conductor constant. The servo-motor is regulated by the electrical output signal of capacitance monitor (10) which measures the coaxial capacitance of the foamed polyolefin insulated conductor in water.

The conductor (1) is taken up by a roll (16), via a capstan (12), an outer diameter measuring device (13), a spark tester (14) and a dancer roll (15).

The polyolefins used in the present invention are polymers, copolymers and terpolymers which have a chain structure of the formula

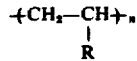

wherein R represents H or a saturated alkyl group having a 1–2 carbon atoms, and $n$ is a positive integer between about 500 and about 20,000.

Examples of the above polymers are polyethylene, polypropylene, polybutene-1. Examples of the above copolymers and terpolymers are ethylene-propylene-copolymer with an ethylene content of at least about 80 percent by weight, ethylene-butene-copolymers with an ethylene content of at least about 80 percent by weight, ethylene-propylene-butene-terpolymers with an ethylene content of at least about 80 percent by weight, propylene-ethylene-copolymers with a propylene content of at least about 80 percent by weight and propylene-butene-copolymers with a propylene content of at least about 80 percent by weight.

Blended polymers of two or more of these polymers and/or copolymers and/or terpolymers may also be used.

In the present invention the melt index of polyolefins is measured by different method depending upon their melting point measured by ASTM,D2117-64 as follows: the melt index of polyolefins having a melting point of $t_1$°C ($t_1 < 150$°C) is measured by condition E of ASTM,D1238-65T; the melt index of polyolefins (having a melting point of $t_2$°C where 150°C $\leq t_2 < 190$°C) by condition L of ASTM,D1238-65T; and the melt index of polyolefins having a melting point of $t_3$°C, where $t_3 \geq 190$°C is measured by condition 0 of ASTM D 1238-65T.

Those polyolefins are preferred which have a melt index of 0.1–2.0 g/10 min, more preferably 0.1–0.8 g/10 min.

Polyethylene, particularly having a density of 0.930–0.960 g/cm$^3$ and a melt index of 0.1–1.0 g/10 min measured by condition E, and polypropylene, particularly having a density of the 0.89–0.910 g/cm$^3$ and a melt index of 0.1–1.0 g/10 min measured by condition L are especially amenable, processing in accordance with the present invention.

It is possible to add polymers other than the polyolefins recited above to the melt in an amount of in less than 50% by weight. Such additive polymers should have a melting point of less than 200°C and have an olefin content of more than 50% by weight. Preferably, such additive polymers are used in an amount of at most 20% by weight, such as those described in "Plastics Copolymer Data" Tokyo 1970 P113–131, P183–195, P279–287, P317–321 and P359–373 (published by Sogo-Kagaku-Kenkyusho).

In the present invention, the chemical blowing agents are the thermal decomposition type blowing agents which are decomposed by heat to generate nitrogen gas, carbon dioxide gas, etc.

Generally, those blowing agents described in the "Modern Plastic Encyclopedia" Vol. 49 No. 10A at pages 292–294 and the "SPE Journal" September 1962, at pages 1184–1192 can be used. Preferred chemical blowing agents are those having a gas yielding amount of about 80 to about 400 cc (at N.T.P.)/g and a decomposition temperature of about 150° to about 250°C. Although numerous examples of such blowing agents will be immediately apparent to one skilled in the art, specific examples of especially useful blowing agents include i. Azo-Compounds, such as azo-di-carbonamide, barium azo-di-carboxylate, etc., ii. N-nitroso-compounds, such as N,N' dinitrosopentamethylenetetramine, iii. Hydrazides, such as P,P'-oxybix(benzenesulphonyl hydrazide). diphenylsulphone-3,3'-disulphonylhydrazide, trihydrazinotriazine, etc., iv. Semicarbazides, such as p-toluene sulfonyl semicarbazide, 4,4'-oxybis(benzene sulfonyl semicarbazide) and the like, and v. Other agents, such as p-toluene sulphonylazide, 4,4'-diphenyl disulfonylazide, and the like.

Azo-di-carbonamides, especially, of a mean particle size smaller than 10 $\mu$, are especially preferable in the present invention, since the cell structure of the foamed insulation layer becomes fine and uniform, and therefore the layer is superior in mechanical properties.

The amount of the blowing agent added to the polyolefin may, of course, vary depending upon the kind and the grade thereof, but in general, falls in the range of 0.5-10.0 % by weight of the polyolefin(s). When azo-di-carbonamide is used as the blowing agent, it is preferably used in an amount of 0.5-5.0 %, especially 0.5-1.0 % by weight.

These chemical blowing agents may be mixed in the polyolefins using a conventional means such as a two roll mill, a tumbler, etc. Alternatively, these agents may also be directly added to the polyolefins in the extruder, together with the softening agents or independently from the softening agents, through a nozzle piercing through the barrel wall of the extruder. When azo-di-carbonamide is used as the chemical blowing agent, some problem may occur in that white solids cling to the inner wall of the extruding die, etc. during the extrusion operation whereby the orifice of the die is narrowed and, as a result, the inner pressure of the extruder rises. According to the studies by the inventors, it has been found that the white solids are decomposition products derived from the azo-di-carbonamide which mainly consist of cyanuric acid. The formation of the white solid can be prevented by the addition of amorphous silicon dioxide having an average particle size smaller than 80 m$\mu$ in an amount of at least 10 %, preferably 20-100 % by weight, based on weight of the blowing agent. The addition of the silicon dioxide does not affect the expansion extrusion in the present invention.

In the present invention, it is mandatory to previously heat the conductor up to a preheating temperature $Tc$ satisfying the following formula:

$$-0.4Tr + 160 \leq Tc \leq -0.4Tr + 300$$

wherein $Tr$ is the extrusion temperature. If $Tc$ is lower than $(-0.4Tr + 160)°C$, the polyolefin extruded on the conductor is rapidly cooled by the conductor to a temperature below the expansion temperature of the extruder and some un-foamed polyolefin wherein orientation of polyolefin molecules occurrs forms on the surface of the conductor and, as a result, the insulation layer does not have sufficient elongation. On the other hand, if the preheating temperature $Tc$ is higher than $(-0.4Tr + 300)°C$, the cell size in the foams becomes too large and, as a result, the surface of the foamed insulation layer becomes rough.

The extrusion temperature $Tr$ is, as described above, the temperature of the expandable polyolefin melt in the crosshead. In practice, the temperature $Tr$ is set at a temperature falling in the decomposition temperature range of the blowing agents used, since blowing agents usually function in a relatively narrow temperature range (that is the decomposition temperature) to expand the polyolefins. For example, when azo-di-carbonamide is used, the preferable extrusion temperature $Tr$ is about 200°C, which is equal to the decomposition temperature of the azo-di-carbonamide. In the present invention, it is preferred to select, in general, an extrusion temperature $Tr$ of 150° to 250°C. While in the prior art, high speed extrusions which provide a superior product at a speed of 500 m/min or more are difficult to achieve, even if softening agents are added. Such are easily obtained in accordance with the present invention.

The preferred range of the conductor preheating temperature somewhat varies with the kinds of polyolefins. When polyethylene is used as the polyolefin, the preferred range thereof is as follows:

$$-0.4Tr + 180 \leq Tc \leq -0.4Tr + 260,$$

more preferably as follows:

$$-0.4Tr + 180 \leq Tc \leq -0.4Tr + 220.$$

In the case of polypropylene, the preferred range is as follows:

$$-0.4Tr + 200 \leq Tc \leq -0.4Tr + 260$$

In the present invention it is also mandatory that a softening agent be added to the polyolefin melt in the extruder in an amount "$X$" (weight% on the basis of the polyolefin) satisfying the following formulae:

$$5 \leq X, \text{ and}$$

$$-10\log_{10}(MI) \leq X \leq -10\log_{10}(MI) + 30.$$

If "$X$" is less than 5% or $[-10\log_{10}(MI)]$%, the viscosity of the polyolefin melt is insufficiently reduced, and the surface smoothness of the resulting foamed insulation layer is lost. On the other hand, when "$X$" is more than $[-10 \log_{10}(MI)+30]$%, the viscosity reduction effect becomes too high and the output of polyolefin extruded varies too widely. As a result, the desired characteristic of the insulation layer cannot be obtained. "$X$" preferably satisfies the following formulae:

$$5 \leq X, \text{ and}$$

$$-10\log_{10}(MI) \leq X \leq -10\log_{10}(MI) +25.$$

In the present invention it is mandatory that the softening agent have a viscosity lower than $10^4$ c.st. at 20°C and a boiling point of 150°-400°C. Such an agent serves well to reduce the viscosity of polyolefin melt and after extrusion with the polyolefin it is readily removed from the foamed polyolefin layer by vaporization and/or migration. If a softening agent having a viscosity higher than $10^4$ c.st. is used, the viscosity reduction effect is insufficient. If a softening agent having a boiling point above 400°C is used, it can hardly be removed from the foamed layer because of its low vaporization. On the other hand, if a softening agent having a boiling point lower than 150°C is used, problems occur in that the cell size of the resulting foamed polyolefin layer becomes too large, or an abnormal expansion in the layer may occur because of unfavorable evaporation during the foaming of the insulation layer.

Among the softening agents satisfying the above requirements, liquid hydrocarbons are preferable in view of the compatibility with the polyolefins.

Examples of such organic compounds are as follows:
a. aliphatic hydrocarbons and substituted aliphatic hydrocarbons, such as nonane, decane, undecane, dodecane, tridecane, tetradecane, pentachloromethane;
b. alicyclic hydrocarbons, such as n-hexyl cyclopentane, n-butylcyclohexane, decalin;
c. aromatic hydrocarbons and substituted aromatic hydrocarbons i. monoalkyl benzene, such as butylbenzene, pentylbenzene, hexylbenzene, nonylbenzene, dodecylbenzene, alkylbenzene mixtures with alkyl groups of carbon numbers of $C_7$–$C_{15}$, tetramethylbenzene, benzilidene chloride
ii. polyalkylbenzene, such as diethylbenzene, triethylbenzene, ethyltoluene, tetramethylbenzene
iii. alkylnaphthalene, such as ethylnaphthalene, dimethylnaphthalene
iv. alkylbiphenyl, such as dimethyldiphenyl
d. alcohols, such as 1-heptanol, 1-octanol, benzyl alcohol
e. ketones, such as acetonylacetone
f. ethers, such as isoamylether
g. esters, such as methyl oleate
h. acids, such as oleic acid
i. polymeric hydrocarbons, such as propylene tetramer, polybutene
j. natural products, such as liquid paraffins, mineral oil, kerosene, etc.

Among these softening agents, those having a boiling point of 190°–350°C and a viscosity of $0.1$–$10^4$ c.st., especially $0.5$–$10^3$ c.st. at 20°C are more preferred, and dimethylbenzene, Tetralin, Decalin (decahyronaphthalene), liquid paraffin, refined mineral oil, polybutene, alkylbenzene mixtures with alkyl groups of carbon numbers of $C_7$–$C_{15}$ are most preferable because of their relatively low odor. Agents other than hydrocarbons can also be used but care should be given to the selection of materials in this case, since softening agent remaining in the foamed layer may have a harmful effect to the electrical properies of the polyolefins.

In the present invention, these softening agents may be pumped into the polyolefin melt in the extruder through a passage-way which pierces through the barrel wall of the extruder. The polyolefin melt in the extruder is in general kept under high pressure, and so it is preferable to use a high pressure pump, particularly a pump which can introduce the softening agent quantitatively into the polyolefin melt under pressure. A plunger pump is preferred, such as a Bosch pump used in a diesel engine. The amount of the softening agent to be injected may be adjusted by means of a flow meter equipped to the pump.

In the present invention the softening agent may be injected from any portion of the barrel to the polyolefin melt in the barrel, so long as the agent is uniformly mixed with the melt upon arriving at the crosshead of the extruder. Such a uniform mixing condition may, for example, be realized by injecting the agent in a barrel portion which falles in a region between ¼ L and ¾ L, preferably ¼ L and ½ L, from the rear end of screw, where L is the length of the screw.

As will be apparent to one skilled in the art the exact extruder type used is not overly critical, e.g., a single screw extruder with an L/D ratio of 15–30, and a compression ratio of 2–4, which is in general use for the extrusion of plastics, can be utilized. Among such extruders, those with an L/D ratio of 20–30, and a compression ratio of 2.5–3.5 are most preferred. In addition, the following various types of extruders can also be employed: Mixing type extruders, such as those described in "Plastics Extrusion Technology", Second Edition, by A. L. Griff, Reinhold, New York, (1968), P7–12, twin screw type extruders such as those described in the above-described "Plastics Extrusion Technology", and the like.

As the crosshead of the extruder, any of those generally used for the extrusion of plastics can be used. It is preferred to use a small crosshead, so that the cell size of the foamed polyolefin becomes uniform and fine and, as a result, a foamed polyolefin insulation layer of high quality may be formed.

In the present invention, it is mandatory that the quenching of the foamed polyolefin insulation layer with water be commenced within $2 \times 10^{-2}$ second after the layer leaves the crosshead of the extruder. If the quenching is delayed, the cell size becomes too large whereby the appearance of the insulation layer worseness. The quenching is preferably commenced within $15 \times 10^{-3}$ second. The time for the extrudate after emerging from the die before quenching in the water cooling trough (which is referred to as "air cooling time" in this specification) may easily be controlled merely by adjusting the distance between the die and the water cooling trough or by changing the line speed of the conductor. The trough is desirably separated from the die by at least 2 cm because a too narrow of a distance between the trough and the die sometimes causes difficulty in the extrusion operation. In the present invention the temperature of the cooling water is set as usual in conventional plastic extrusions, i.e., water both is maintained at a temperature lower than the temperature of solidification of the polyolefin. Generally this is about 20°C below the melting point of the polyolefin and most preferably is at a temperature lower than 50°C.

The layer on the conductor which is formed in accordance with the present invention foams with fine cells which are uniformly distributed allover the cross section of the layer and have a diameter below 30 $\mu$. As a result, the layer is superior in mechanical properties especially tensile strength, elongation and abrasion resistance, and in electrical properties, especialy uniformity of electrostatic capacitance. Therefore the foamed polyolefin insulated conductors obtained by the present invention are satisfactorily used in communication cables.

Preferred foam layers exhibit the following characteristics:

i. cell size: 10–30 $\mu$: at least 80 % (by number);
ii. uniformly foamed;
iii. elongation: more than 200 %;
iv. tensile strength: more than 1 $kg/mm^2$;
v. static capacity; scattering from the predetermined value of static capacity: less than ± 15%.
vi. fluctuation of outer diameter; scattering from the predetermined value: less than ± 10 %.

In the melt, of the above mentioned polyolefin melt, optional additives such as pigments, for example carbon black, titanium dioxide, cadomium sulfide, phtharocyanine blue, etc; stabilizers, for example 2,6-di-tert-butyl-p-cresol, 4,4′-thiobis-(6-tert-butyl-3-methylphenol), 4,4′-butylidenebis-(6-tert-butyl-m-cresol), 2,6-di-tert-butylphenol, 2,2′-methylene-bis-(6-tert-butyl-4-cresol), etc.; slip agents, for example butyl stearate, stearyl alcohol, methylol amide, oleyl amide may of course be incorporated into the melt in a manner known to the art.

These additives are preferably admixed in an amount of 0.01–5 percent by weight on the basis of the polyolefin.

The present invention will now be illustrated in detail by several preferred examples which, however, do not limit the present invention.

EXAMPLE 1

A compound composed of polyethylene (density: 0.92 g/cm³, MI: 0.2) and 0.7% by weight of azo-dicarbonamide (mean particle size: 5μ) was extruded by an extruder having a barrel diameter of 65 mm which was equipped with a screw having an L/D ratio of 22.5 and a compression ratio of 3.0.

Tetralin was continuously injected into the polyethylene melt at a rate of 33 cc/min through a nozzle mounted on the barrel wall at a position of 2/5L of the whole length of the screw. The amount of tetraline in the polyethylene melt is 20% by weight (calculated from the injection rate of tetraline and the amount of the material extruded in one minute). Hereinafter, the amount of softening agent injected in the melt was calculated in the same manner.

The melt thus including Tetralin was extruded from the die of the extruder at an extrusion temperature Tr of 200°C onto a copper conductor of 0.4 mm in diamter which was preheated to a temperature of 150°C (Tc) and fed at a line speed of 1100 m/min.

The distance between the quench point and the extruder die was about 18 cm ("air cooling time" was about $1 \times 10^{-2}$ second). The temperature of the water in the water trough was about 30°C. The thickness of the foamed insulation layer on the conductor was 0.10 mm and the percentage expansion of the insulation was about 30%. The results of this run are tabulated in Table I.

EXAMAPLES 2–8, REFERENCE EXAMPLES 1–2

Runs similar to Example 1 were performed except that the preheating temperature of the conductor and the resin used were varied as shown in Table I. The thickness of the insulation layer of each of the foamed polyolefin insulated conductor obtained in the above mentioned extrusion experiments was about 0.1 mm. The results of Examples 2–8 and Reference Examples 1–2 are also shown in Table I.

Remarks:

*a: The surface condition of insulation layer is rated by the following criterion:
  No. 1: smooth and lustrous
  No. 2: smooth but lusterless
  No. 3: somewhat rough
  No. 4: coarse

*b: This value was measured on a tubular sample of the foamed insulation stripped from an insulated conductor at a grip separation speed of 500 mm/min.

*c: A cross section of insulation was observed under an optical microscope at 100 x. The cell structure was graded as follows:
  No. 1: Cells are uniformly dispersed and the maximum cell size is smaller than 15 μ.
  No. 2: The maximum cell size is 15–20 μ. The dispersion of cells is uniform.
  No. 3: The maximum cell size is 20–30 μ, and the dispersion of cells is somewhat non-uniform.
  No. 4: The maximum cell size is larger than 30 μ, and the dispersion of cells is not uniform.

*d: From the specific gravity (Wf) of the foamed insulation layer and the specific gravity (Ws) of the base resin of the insulation, the percentage expansion was calculated by the following formula:

$$(1 - \frac{Wf}{Ws}) \times 100 \, (\%)$$

*e: The inner pressure of the crosshead was measured with a conventional Bourdon type pressure gage.

EXAMPLES 9–15, REFERENCE EXAMPLE 3

Runs similar to Example 1 were performed except that the softening agent and the amount injected were changed as shown in Table II.

The results of Examples 9–15 and Reference Example 3 are shown in Table II.

Table I

| Example No. | Resin | Density (g/cm³) | Melt Index (g/10mins.) | Preheating Temp. of Conductor (°C) | (*e) Pressure in Crosshead (Kg/cm²) | (*a) Surface Appearance of Insulation | (*b) Elongation (%) | (*d) Percentage Expansion (%) | (*c) Cell Structure |
|---|---|---|---|---|---|---|---|---|---|
| 1 | low density polyethylene | 0.92 | 0.25 | 150 | 380 | No. 1 | 320 | 30 | No. 1 |
| 2 | low density polyethylene | 0.92 | 0.25 | 110 | 390 | No. 1 | 200 | 20 | No. 1 |
| 3 | low density polyethylene | 0.92 | 0.25 | 170 | 380 | No. 1 | 300 | 32 | No. 2 |
| 4 | polypropylene | 0.90 | 0.3 | 160 | 360 | No. 1 | 350 | 30 | No. 1 |
| 5 | polypropylene | 0.90 | 0.3 | 130 | 370 | No. 1 | 320 | 23 | No. 1 |
| 6 | high density polyethylene | 0.948 | 0.22 | 170 | 350 | No. 1 | 300 | 29 | No. 1 |
| 7 | high density polyethylene | 0.948 | 0.22 | 130 | 350 | No. 1 | 310 | 25 | No. 1 |
| 8 | polypropylene | 0.90 | 0.3 | 140 | 390 | No. 1 | 200 | 20 | No. 1 |
| Reference Examples No. | | | | | | | | | |
| 1 | low density polyethylene | 0.92 | 0.25 | 70 | 390 | No. 2 | 50 | 18 | No. 2 |
| 2 | low density polyethylene | 0.92 | 0.25 | 220 | 380 | No. 3 | 300 | 35 | No. 4 |

Table II

| Example No. | Softening Agent Kind | Softening Agent Amount Injected (%) | Pressure in Crosshead (Kg/cm²) | Surface Appearance of Insulation Layer (Surface Condition) | Elongation (%) | Cell Structure |
|---|---|---|---|---|---|---|
| 9 | tetralin | 8 | 460 | No. 1 | 200 | No. 1 |
| 10 | tetralin | 15 | 400 | No. 1 | 300 | No. 1 |
| 11 | tetralin | 25 | 360 | No. 1 | 350 | No. 1 |
| 12 | alkylbenzene mixture(*f) | 18 | 380 | No. 1 | 290 | No. 1 |
| 13 | decalin | 18 | 380 | No. 1 | 300 | No. 1 |
| 14 | liquid paraffin(*g) | 18 | 390 | No. 1 | 280 | No. 1 |
| 15 | polybutene (*h) | 18 | 385 | No. 1 | 270 | No. 1 |
| Reference Example No. 3 | tetralin | 35 | 280 | No. 2 | 250 | No. 4 |

Remarks:

(*f) soft-type alkylbenzene mixture, having linear alkyl groups of $C_9 - C_{13}$, b.p. 320°C; viscosity, 7.1 c.st. at 100°F (*g) liquid paraffin, b.p. 290°C; viscosity, 98 c.st. at 100°F (*h) polybutene, b.p. 301°C; viscosity, 32 c.st. at 100°F

EXAMPLES 11–14, REFERNCE EXAMPLE 4

Runs similar to Example 1 were performed except that the kind of polyethylene and the amount of injected softening agent (Tetralin) were varied as shown in Table III. The results of Example 11–14 and Reference Example 4 are shown in Table III.

Table III

| Example No. | Polyethylene Density (g/cm³) | Polyethylene Melt Index (g/10 mins.) | Tetraline injected amount (%) | Pressure in Crosshead (Kg/cm²) | Surface Appearance of Insulation | Elongation (%) | Cell Structure |
|---|---|---|---|---|---|---|---|
| 16 | 0.958 | 0.1 | 28 | 460 | No. 1 | 290 | No. 1 |
| 17 | 0.948 | 0.25 | 20 | 440 | No. 1 | 320 | No. 1 |
| 18 | 0.949 | 0.7 | 10 | 350 | No. 1 | 310 | No. 1 |
| 19 | 0.955 | 1.0 | 5 | 280 | No. 1 | 290 | No. 1 |
| Reference Ex. 4 | 0.946 | 0.3 | 3 | 480 | No. 3 | 70 | No. 1 |

Table IV

| Example No. | Amount of Injected Alkylbenzene (%) | Pressure in Crosshead (Kg/cm²) | Surface Appearance of Insulation | Elongation (%) | Cell Structure |
|---|---|---|---|---|---|
| 20 | 10 | 490 | No. 1 | 320 | No. 1 |
| 21 | 20 | 420 | No. 1 | 340 | No. 1 |
| 22 | 28 | 350 | No. 1 | 350 | No. 1 |

EXAMPLES 20–22

Runs similar to Example 17 were performed except that the alkylbenzene mixture used in Example 12 as the softening agent was employed in the amounts showing in Table IV. The results were as follows:

EXAMPLES 23–25

A series of runs was made with various blowing agents. Various kinds of blowing agents were used in various amounts, as shown in Table V. The extrusion temperature is also shown in Table V. The other conditions were the same as in Example 21. The results were as follows:

Table V

| Example No. | Blowing Agent Kind | Blowing Agent Amount per polyethylene (%) | Extrusion Temp. (°C) | Pressure in Crosshead (Kg/cm²) | Surface Appearance of Insulation (Surface Condition) | Elongation (%) | Cell Structure |
|---|---|---|---|---|---|---|---|
| 23 | azo-dicarbonamide | 0.7 | 200 | 450 | No. 1 | 320 | No. 1 |
| 24 | 4,4'-oxy-bis(benzene-sulfonyl-semicarbazide) | 1.0 | 210 | 420 | No. 2 | 330 | No. 2 |
| 25 | tri-hydrazino-tri-azine | 1.0 | 270 | 370 | No. 2 | 220 | No. 2 |

EXAMPLES 26–30

Runs were performed under the same conditions as in Example 23 except that extrusion speed, the diameter of the copper conductor and the thickness of the foamed polyethylene insulation layer were changed as shown in Table VI. The results are also shown in Table VI.

Table VI

| Example No. | Diameter of Conductor (mm) | Extrusion Speed (m/min) | Polyethylene Layer Thickness (mm) | Percentage Expansion (%) | Pressure in Crosshead (Kg/cm$^2$) | Surface Appearance of Insulation (Surface Condition) | Elongation (%) | Cell Structure |
|---|---|---|---|---|---|---|---|---|
| 26 | 0.32 | 900 | 0.10 | 20 | 340 | No. 1 | 300 | No. 1 |
| 27 | 0.40 | 1500 | 0.10 | 20 | 470 | No. 1 | 260 | No. 1 |
| 28 | 0.40 | 1500 | 0.20 | 25 | 470 | No. 1 | 350 | No. 1 |
| 29 | 0.65 | 1000 | 0.20 | 25 | 400 | No. 1 | 300 | No. 1 |
| 30 | 0.90 | 800 | 0.40 | 30 | 360 | No. 1 | 290 | No. 1 |

EXAMPLES 31–32, REFERENCE EXAMPLE 5

Runs similar to Example 23 were performed except that the "air cooling time" was varied as shown in Table VII, the results also being shown in Table VII.

Table VII

| Example No. | Air Cooling Time (second) | Pressure in Cylinder (Kg/cm$^2$) | Surface Appearance of Insulation (Surface Condition) | Elongation (%) | Cell Structure |
|---|---|---|---|---|---|
| 31 | 1×10$^{-3}$ | 440 | No. 1 | 300 | No. 1 |
| 32 | 5×10$^{-3}$ | 440 | No. 1 | 320 | No. 1 |
| Reference Example No. 5 | 4×10$^{-2}$ | 440 | No. 3 | 230 | No. 4 |

EXAMPLES 33–36

Runs similar to Example 23 were performed except that various kinds of amourphous silicon dioxide were incorporated in various amounts into the melt as shown in Table VIII, the results also being shown in Table VIII.

While the invention has been described in detail and with reference to specific embodiments thereof, it will be apparent to one skilled in the art that various changes and modifications can be made therein without departing from the spirit and scope thereof.

What is claimed is:

1. A process for producing a foamed polyolefin insulated conductor having a insulation wall thickness of 0.08–0.5 mm by extruding an expandable polyolefin melt, wherein the polyolefin has a melt index of 0.1 to 2.0 10 g/min, containing a chemical blowing agent onto a conductor having an outer diameter of 0.32–1.20 mm comprising:

a. adding an organic softening agent having a viscosity lower than 10$^4$ c.st. at 20°C and a boiling point of 150°–400°C to the polyolefin melt in an extruder in an amount satisfying the following formula:

$$5 \leq X, \text{ and } -10\log_{10}(MI) \leq X \leq -10\log_{10}(MI) + 30$$

wherein $X$ is the percent by weight of the softening agent based on the weight of polyolefin melt and $MI$ is the melt index of the polyolefin;

b. mixing said polyolefin melt and said softening agent in the extruder;

c. extruding the polyolefin melt containing the softening agent onto the conductor to make a foamed layer around it, said conductor, prior to being introduced into the crosshead of the extruder, having been heated up to the temperature Tc(°C) satisfying the following formula:

Table VIII

| Example No. | Amount of Azo-di-carbonamide per Polyethylene (%) | Kind of Silicon Dioxide (*i) | Amount of Silicon Dioxide per Azo-di-carbonamide (%) | Pressure in Crosshead (Kg/cm$^2$) | Surface Appearance of Insulation (Surface Condition | Elongation (%) | Cell Structure |
|---|---|---|---|---|---|---|---|
| 33 | 0.7 | A | 10 | 440 | No. 1 | 350 | No. 1 |
| 34 | 0.7 | A | 30 | 440 | No. 1 | 350 | No. 1 |
| 35 | 0.7 | B | 70 | 440 | No. 1 | 350 | No. 1 |
| 36 | 0.7 | A | 100 | 440 | No. 1 | 350 | No. 1 |

Remarks:
(*i) A is aerosil 2000 (amorphous silicon dioxide having an average particle size of 25 m$\mu$) manufactured by Japan Aerosil Company. B is Tokusil VR (amorphous silicon dioxide having an average particle size of 100 m$\mu$) manufactured by Tokuyama Soda Company.

$$-0.4Tr + 160 \leq Tc \leq -0.4Tr + 300$$

wherein $Tr$ is the temperature of the polyolefin melt in the crosshead of the extruder; and then d. initiating the water cooling of the foamed polyolefin layer on the conductor within $2 \times 10^{-2}$ seconds after the layer leaves the crosshead of the extruder.

2. A process as claimed in claim 1 wherein said chemical blowing agent is incorporated into the polyolefin prior to said polyolefin being introduced into said extruder.

3. A process as claimed in claim 1 wherein said chemical blowing agent is added to the polyolefin in the extruder.

4. A process as claimed in claim 1 wherein the polyolefin is a polyethylene having a density in the range of 0.93–0.96 g/cm$^3$ and a melt index in the range of 0.1–0.5 g/10 minutes.

5. A process as claimed in claim 1 wherein the polyolefin is a polypropylene having a density in the range of 0.89–0.91 g/cm$^3$ and a melt index in the range of 0.1–1.0 g/10 minutes.

6. A process as claimed in claim 1 wherein said chemical blowing agent is azo-di-carbonamide having a particle size smaller than 10$\mu$.

7. A process as claimed in claim 1 wherein said softening agent is a hydrocarbon.

8. A process as claimed in claim 7 wherein said hydrocarbon has a boiling point of 190°–350°C and a viscosity of 0.5–10$^3$ c.st. at 20°C.

9. A process as claimed in claim 7 wherein said hydrocarbon is at least one member selected from the group consisting of demethyl-benzene, tetrahydronaphthalene, decahydronaphthalene, decaline, liquid paraffin, mineral oil, polybutene and an alkylbenzene mixture.

10. A process as claimed in claim 1 wherein the polyolefin is polyethylene, and the conductor is previously heated up to the temperature ($Tc$) satisfying the following formula:

$$-0.4Tr + 180 \leq Tc \leq -0.4Tr + 260$$

11. A process as claimed in claim 1 wherein the polyolefin is polypropylene, and the conductor is previously heated up to the temperature ($Tc$) satisfying the following formula:

$$-0.4Tr + 200 \leq Tc \leq -0.4Tr + 260$$

12. A process as claimed in claim 1 wherein the amount of (X) of the softening agent to be added satisfying the following formulae:

$$X \leq 5, \text{ and}$$

$$-10\log_{10}(MI) \; 10 \leq X \leq 10\log_{10}(MI) + 25$$

13. A process as claimed in claim 1 wherein water cooling is initiated within $15 \times 10^{-3}$ second.

* * * * *

UNITED STATES PATENT AND TRADEMARK OFFICE
CERTIFICATE OF CORRECTION

PATENT NO. : 3,896,198
DATED : July 22, 1975
INVENTOR(S) : Atushi Utumi et al.

It is certified that error appears in the above-identified patent and that said Letters Patent are hereby corrected as shown below:

Column 8, line 54, change "melt," first occurrence to --extrusion--

Column 9, line 35, change "EXAMAPLES 2-8" to -- EXAMPLES 2-8 --.

Column 16, line 24, change "$X \leq 5$" to --$X \geq 5$--;

line 25, change "$-10\log_{10}(MI)10$" to -- $-10\log_{10}(MI) + 10$ --.

Signed and Sealed this

Eighteenth Day of January 1977

[SEAL]

Attest:

RUTH C. MASON
Attesting Officer

C. MARSHALL DANN
Commissioner of Patents and Trademarks